United States Patent
Jones

(10) Patent No.: US 12,523,180 B2
(45) Date of Patent: Jan. 13, 2026

(54) CONTROLLING SUPPLY OF AIRCRAFT ENGINE WITH MULTIPLE FUELS

(71) Applicant: AIRBUS OPERATIONS LIMITED, Bristol (GB)

(72) Inventor: Amelia Jones, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/960,971

(22) Filed: Nov. 26, 2024

(65) Prior Publication Data
US 2025/0172097 A1 May 29, 2025

(30) Foreign Application Priority Data
Nov. 28, 2023 (GB) .................................... 2318110

(51) Int. Cl.
*F02C 9/40* (2006.01)
*B64D 37/30* (2006.01)

(52) U.S. Cl.
CPC .............. *F02C 9/40* (2013.01); *B64D 37/30* (2013.01)

(58) Field of Classification Search
CPC ..... F02C 9/40; F02C 3/20; F02C 3/24; B64D 37/30
See application file for complete search history.

(56) References Cited

U.S. PATENT DOCUMENTS

| 10,501,199 B2 | 12/2019 | Horn | |
|---|---|---|---|
| 2023/0192303 A1* | 6/2023 | Swann | F02C 7/22 244/135 R |

FOREIGN PATENT DOCUMENTS

| EP | 2860374 A1 | 4/2015 |
|---|---|---|
| EP | 4123145 A1 | 1/2023 |
| EP | 4202195 A1 | 6/2023 |
| GB | 2614611 A | 7/2023 |
| WO | 2022/122887 A1 | 6/2022 |
| WO | WO-2023139295 A1 * | 7/2023 |

OTHER PUBLICATIONS

Combined Search and Examination Report for Application No. GB2318110.0, dated May 13, 2024, 8 pages.

* cited by examiner

*Primary Examiner* — Steven M Sutherland
(74) *Attorney, Agent, or Firm* — Nixon & Vanderhye P.C.

(57) ABSTRACT

A method of controlling the supply of multiple fuels to an engine of an aircraft is disclosed. The aircraft includes a first fuel having a first composition and a second fuel having a second composition. The second composition comprises a greater proportion of sustainable aviation fuel, SAF, than the first composition. The engine is supplied with the first fuel during a first phase of flight of the aircraft. During a second phase of the flight of the aircraft, subsequent the first phase, supply to the engine is switched from the first fuel to the second fuel.

18 Claims, 4 Drawing Sheets

CONTROLLING SUPPLY OF AIRCRAFT ENGINE WITH MULTIPLE FUELS

CROSS RELATED APPLICATION

This application claims priority to United Kingdom Patent Application GB 2318110.0, filed Nov. 28, 2023, the entire contents of which is hereby incorporated by reference.

BACKGROUND OF THE INVENTION

The present disclosure relates to aircraft, and in particular to the supply of fuel to an engine of an aircraft.

Conventional jet fuels based on hydrocarbons currently represent the backbone of fuel supply in aviation. However, existing fossil resources are inherently restricted, so that it can be expected that in future fossil-fuel-derived jet fuels will no longer be able to be obtained and/or used at acceptable prices or in sufficient quantities. Therefore the use of alternative fuels in aviation is and will be explored. Sustainable aviation fuel, SAF, which is not derived from fossil fuels, may be produced from sustainable feedstocks and have a similar chemistry to conventional jet fuel. Thus SAF may be used to power aircraft engines. However, until such alternative fuels are more extensively produced and/or provided, aircraft may be designed for the purpose of being able to be operated using two different fuel types, namely a conventional jet fuel and a sustainable aviation fuel.

The present invention seeks to mitigate one or more of the above-mentioned problems. Alternatively or additionally, the present invention seeks to provide an improved method of controlling the supply of fuels to an engine of an aircraft.

SUMMARY OF THE INVENTION

According to a first aspect, there is provided a method of controlling the supply of multiple fuels to at least one engine of an aircraft, the aircraft comprising a first fuel having a first composition and a second fuel having a second composition, the method comprising: supplying the at least one engine with the first fuel during a first phase of flight of the aircraft; and during a second phase of the flight of the aircraft, subsequent the first phase, switching from supplying the at least one engine with the first fuel to supplying the at least one engine with the second.

Preferably, the second fuel (or the second composition) produces fewer emissions when combusted than the first fuel (or the first composition). That is, the second fuel may be more environmentally-friendly than the first fuel. For example, the second fuel may comprise an alternative fuel, and the first fuel may be conventional fossil-fuel-based jet fuel. The second fuel may be more sustainable than the first fuel. For example, the second fuel may be at least partially renewable and/or derived from renewable sources. In embodiments, the second composition comprises a greater proportion of sustainable aviation fuel, SAF, than the first composition. In embodiments, the second fuel comprises a modified fuel, such as crude fuel with beneficial additives or that has been refined for environmental benefit. In embodiments, the second fuel comprises a synthesised fuel. The second fuel may comprise hydrogen or ammonia, for example, or may be kerosene-based.

As such, the second fuel, which may comprise a greater proportion of SAF than the first fuel, is used after the first fuel during the flight. That is, the first fuel is used first, and the second fuel is used after the first fuel is used. It will be understood that, during the first phase of the flight, only the first fuel (and not the second fuel) is supplied to the at least one engine, and after the switching occurs during the second phase of the flight, only the second fuel (and not the first fuel) is supplied to the at least one engine. The first fuel and the second fuel are thus supplied separately and sequentially to the at least one engine, and are not mixed or blended. In other words, the first fuel and the second fuel are used independently. As described in more detail below, the first fuel and the second fuel may be stored separately, in a segregated manner, on the aircraft, for example in separate fuel tanks.

SAFs may have a lower physical density than non-sustainable or fossil-fuel-based jet fuels. Therefore, the second fuel (having a higher proportion of SAF, e.g. 100% SAF) may be less physically dense than the first fuel (having a lower proportion of SAF, e.g. 0% SAF). Consequently, a given volume of the second fuel may be lighter than the same volume of the first fuel. The total fuel carried on the aircraft may thus have a reduced weight compared to a case in which only fuel having the first composition (e.g. 0% SAF) is carried. This extends the range of the aircraft and/or allows for greater passenger weight. Such a weight benefit is further increased by storing and using the first and second fuels separately and sequentially, rather than blending the first and second fuels. Moreover, by using the first fuel before the second fuel, the heavier fuel is used first. This means that the lighter fuel is maintained on the aircraft for longer, thereby extending the flight period during which the relative weight gain (in terms of reduced weight) is present, thus extending the flight range of the aircraft.

Further, SAFs may have a higher energy density than non-sustainable or fossil-fuel-based jet fuels. Energy density is the amount of energy stored in a given system or region of space per unit mass. The higher the energy density of a fuel, the more energy it provides per unit weight. This means that for the same weight of fuel, an aircraft can fly farther or longer if it is using a fuel with higher energy density. The SAF can thus increase the range of an aircraft due to its higher energy density as well as lower physical density. SAFs with a lower physical density and higher energy density than conventional jet fuel can be used as a weight-saving technique whilst simultaneously increasing range and/or reducing fuel costs and/or consumption. For example, SAFs produced using processes such as the Fischer-Tropsch process or SAFs produced from feedstocks like algae, have demonstrated potential for higher energy densities than conventional jet fuel. This is due to the chemical structure and make-up of these fuels.

Moreover, SAF production processes can be tailored to produce SAFs having desired characteristics, e.g. a higher energy density and/or lower physical density than conventional jet fuel. SAFs are made up of more saturated single hydrocarbons (alkanes) than typical jet fuel. This means that there are single bonds between carbon atoms which yield a higher hydrogen-to-carbon ratio, leading to a higher energy density since combustion of hydrogen releases energy. Conventional jet fuel is made up of both alkanes and aromatics, which can result in a lower energy density than SAFs. In operation, aircraft may have weight limits. Since SAF has a higher energy density than conventional jet fuel, it means that for the same amount of energy (e.g. to power a flight for X hours) a lesser amount of SAF is needed compared to a conventional jet fuel with a lower energy density. This weight saving can then be used to carry additional fuel, which in turn extends the range of the aircraft. As such, each of the lower physical density of SAF and the higher energy density of SAF allow the range of the aircraft to be extended.

Such a range extension is also achieved where a combination of SAF and non-sustainable jet fuels is used during a flight, preferably when the non-sustainable jet fuel is used before the SAF, as described herein.

Further, using the second fuel after the first fuel sequentially during the flight may reduce emissions compared to a case in which only the first fuel is used, or compared to a case in which the second fuel is used before the first fuel, or compared to a case in which a blend of the first and second fuels is used. This may particularly be the case where the second fuel is supplied to the at least one engine when the aircraft is at high altitude (e.g. during a cruise stage of flight). At high altitudes (e.g. regions of the atmosphere where the air temperature may be below 0 C.), the aircraft is more likely to fly through areas of ice supersaturation, leading to the creation of contrails. Using the first fuel in these regions has the potential to increase the net effective radiative forcing of a contrail due to the evolution of long-lasting contrail cirrus. On the other hand, burning SAFs with negligible aromatic content reduces the probability of long-lasting contrail cirrus formation. Moreover, a reduction in the effective radiative forcing of the contrail cirrus may be obtained. This trend has been seen to correlate with nVPM (non-volatile particulate matter) as well as aromatic content. By using a dual fuel strategy, where the second fuel is used during the cruise phase, long-lasting contrail cirrus and contrail radiative forcing can be decreased.

Additionally, using the second fuel after the first fuel sequentially during the flight may improve the operation of the at least one engine of the aircraft. In particular, burning SAF (or a fuel with a relatively high proportion of SAF) at high altitude is better for the function of the engine, e.g. in terms of cleaner combustion, than burning conventional jet fuel at high altitude. Therefore the performance and/or operation of the engine may be improved by using the first fuel before the second fuel, e.g. because more of the first fuel is used before the aircraft is cruising at high altitude and more of the second fuel is used when the aircraft is cruising at high altitude.

As mentioned above, the first fuel and the second fuel may be stored separately, in a segregated manner, on the aircraft. For example, the first fuel and the second fuel may be stored in separate fuel tanks, or in separate partitions of a single fuel tank. This is in contrast with cases in which different fuels are stored or used in a blended or mixed state on the aircraft, or are fluidly connected to one another. The separate storage and dispensing of SAF with conventional jet fuel allows for dynamic fuel management to improve engine performance during different flight phases. SAFs have a higher energy density when compared to conventional jet fuel. Segregated storage allows for the effective blending of SAF without actually blending SAF and non-SAF fuels, where 100% SAF may still be burnt during particular stages of the flight, thereby increasing the overall energy density and range of a given flight.

In embodiments, the switching is performed in response to a determination that an amount of the first fuel remaining in the aircraft is less than a predetermined threshold. For example, the predetermined threshold may be 10%, or preferably 5% of the initial amount of the first fuel in the aircraft. Thus, the first fuel is supplied to the at least one engine until the amount of the first fuel remaining falls below a threshold, at which point the supply is switched to the second fuel. One or more sensors may be used to determine an amount of the first fuel remaining in the aircraft, e.g. by sensing a level of the first fuel remaining in a fuel tank containing the first fuel. In some cases, the switching is performed in response to a determination that the first fuel has been substantially expended. That is, all (or substantially all) of the first fuel may be expended before the supply of the at least one engine is switched to the second fuel.

Sustainable aviation fuel, SAF, is a type of fuel that is produced from sustainable and/or renewable sources. This is in contrast with conventional jet fuel, which is derived from fossil fuels. For example, SAF may be produced from feedstocks such as agricultural residues, biomass, algae, waste oils, etc. As mentioned above, SAF may have a lower physical density and/or a higher energy density than fossil-fuel-derived jet fuels.

In embodiments, the second composition comprises at least 60% SAF, and preferably at least 70% SAF. A composition of 70% SAF may include 30% non-sustainable aviation fuel, for example. In embodiments, the second composition comprises at least 80% SAF. Preferably, the second composition comprises at least 90% SAF, and more preferably at least 95% SAF. In embodiments, the second composition comprises at least 99% SAF. In embodiments, the second composition comprises 100% SAF. That is, the second composition may, in some cases, comprise only sustainable aviation fuel, and no non-sustainable or fossil-fuel-based aviation fuel.

Preferably, the second fuel is a fuel derived from a Fischer-Tropsch, FT, process. An FT process involves chemical reactions that convert a mixture of carbon monoxide and hydrogen into liquid hydrocarbon. Fuels derived from an FT process may have a higher energy density and/or a lower physical density than fossil-fuel-derived jet fuels. In embodiments, the second fuel is a Hydroprocessed Esters and Fatty Acids, HEFA, fuel. HEFA fuels may have a higher energy density and/or a lower physical density than fossil-fuel-derived jet fuels. In embodiments, the second fuel is a Synthesised Iso-Paraffin, SIP, fuel. In embodiments, the second fuel is an algae-derived biofuel. In embodiments, the second fuel comprises or is derived from Alcohol-to-Jet, Power-to-Liquid (DACC), and/or pyrolysis. In embodiments, the second fuel comprises or is derived from hydrogen.

In embodiments, the first composition comprises less than 50% SAF, and preferably less than 40% SAF, and more preferably less than 30% SAF. In embodiments, the first composition comprises less than 20% SAF, and preferably less than 10% SAF, and more preferably less than 5% SAF. In embodiments, the first composition comprises less than 1% SAF. In embodiments, the first composition comprises only non-sustainable or fossil-fuel-based aviation fuel and no SAF, i.e. 0% SAF. For example, the first fuel may be or comprise Jet A-1 fuel. Preferably, the first fuel is a fossil-fuel-derived jet fuel and the second fuel is 100% SAF.

In embodiments, the second phase of the flight is part of a cruise stage of the flight. The first phase may also be part of the cruise stage of the flight. Additionally or alternatively, the first phase may include a take-off and/or climb stage of the flight. As such, the switching from supplying the at least one engine with the first fuel to supplying the at least one engine with the second fuel may be performed during the cruise stage of the flight. Hence, the second fuel (containing a higher proportion of SAF, and optionally 100% SAF) may be supplied to the engine during the cruise stage of the flight. In embodiments, the second phase includes a landing stage of the flight, additionally or alternatively to a part of the cruise stage. In embodiments, the second phase of the flight is immediately after (i.e. contiguous with) the first phase of the flight. In alternative embodiments, the second phase is after, but not immediately after, the first phase.

In embodiments, all of the first fuel is used in the first phase of the flight, and the second fuel is used in the second phase of the flight (e.g. a cruise stage). Alternatively, the first fuel may not all be used in the first phase of the flight. For example, a first phase (e.g. including ground operations, take-off, climb, and optionally some of the cruise stage) uses the first fuel. Then the fuel supply may be switched to the second fuel during the cruise stage (or as soon as the cruise stage begins). Once the second fuel is used up (e.g. after the cruise stage), the fuel supply may be switched back to the first fuel (e.g. for a third phase of the flight, including descent and landing). Alternatively, not all of the second fuel may be used during the flight. Any leftover second fuel may be kept to be used for a cruise stage in a subsequent flight.

In embodiments, the first fuel is contained in a first fuel tank of the aircraft and the second fuel is contained in a second fuel tank of the aircraft. In alternative embodiments, the first fuel and the second fuel may both be stored in the same fuel tank, but may be segregated within the fuel tank, e.g. via a partition. In either case, the first fuel and the second fuel may be stored separately and/or in separate locations on the aircraft. This allows each of the fuels to be supplied separately and sequentially to the at least one engine, without mixing or blending the fuels.

In embodiments, the first fuel tank is arranged on a wing of the aircraft. In embodiments, the second fuel tank is arranged on a fuselage of the aircraft. That is, the second fuel tank may comprise a centre fuel tank of the aircraft. The second fuel tank may be a main or primary fuel tank of the aircraft. The second fuel tank may thus have a greater capacity than the first fuel tank. In some examples, both the first fuel tank and the second fuel tank are arranged on the fuselage of the aircraft or on a wing of the aircraft. In embodiments, the aircraft comprises a further fuel tank containing the first fuel. The further fuel tank may be arranged on a wing of the aircraft. As such, the first fuel may be contained in two fuel tanks on the wings of the aircraft, e.g. one fuel tank on each wing, or two fuel tanks on a single wing. In such embodiments, the at least one engine is supplied with the first fuel from the further fuel tank (in addition to the first fuel tank) prior to the second phase of the flight, e.g. during the first phase of the flight.

In embodiments, the first fuel tank (e.g. a wing fuel tank) and the second fuel tank (e.g. a central fuel tank) are each able to supply the same engine of the aircraft. The engine is thus supplied from the first fuel tank in the first phase of the flight, and from the second fuel tank in the second phase of the flight. Where a further fuel tank containing the first fuel is provided, the further fuel tank may supply a different engine compared to the first fuel tank. The different engine may also be supplied from the second fuel tank. In other words, during the first phase of the flight, a first engine may be supplied with the first fuel from the first fuel tank and a second engine may be supplied with the first fuel from the further fuel tank. After the first phase of the flight, both the first engine and the second engine may be supplied with the second fuel from the second fuel tank. In some cases, the aircraft comprises a second further fuel tank containing the second fuel.

Different types of aircraft may have different numbers of fuel tanks and/or engines. For example, a given aircraft may comprise 11 fuel tanks. It will be understood that the presently-described methods may be implemented with any number of fuel tanks and/or engines. In embodiments, the first fuel tank and/or the second fuel tank may be arranged in a tail of the aircraft.

The method may be performed by a control unit of the aircraft. The control unit is operable to perform various data processing and/or control functions, and may be implemented in hardware and/or software. For example, the control unit may be embodied as one or more software functions and/or hardware modules. In embodiments, the control unit comprises one or more processors configured to process instructions and/or data. Operations performed by the one or more processors may be carried out by hardware and/or software. The control unit may be configured to implement at least some of the methods described herein. In embodiments, the control unit is operable to output control signals for controlling one or more components of the aircraft.

In embodiments, the first fuel tank is part of a first supply apparatus of the aircraft, and the second fuel tank is part of a second supply apparatus of the aircraft. Each of the first and second supply apparatus may comprise respective fuel injection devices, pumps, fuel lines, etc. A control unit may be connected to the first and second supply apparatus, and may control the supply of fuels to the at least one engine by controlling the first and second supply apparatus, e.g. to cause the first supply apparatus to supply fuel from the first fuel tank to the at least one engine in the first phase of the flight. For example, the control unit may output control signals to control the first and second supply apparatus and cause the first and second supply apparatus to supply their respective fuels to the at least one engine.

In embodiments, the first fuel tank and the second fuel tank are part of a fuel supply system that is switchable between a first mode, in which the at least one engine is supplied with the first fuel from the first fuel tank, and a second mode, in which the at least one engine is supplied with the second fuel from the second fuel tank. In such embodiments, the fuel supply system may be operated in the first mode during the first phase of the flight, and may be switched from the first mode to the second mode after the first phase of the flight (e.g. during the second phase of the flight).

According to a second aspect there is provided a control unit for controlling the supply of multiple fuels to at least one engine of an aircraft, the aircraft comprising a first fuel having a first composition and a second fuel having a second composition, the second composition comprising a greater proportion of sustainable aviation fuel, SAF, than the first composition, wherein the control unit is configured to: supply the at least one engine with the first fuel during a first phase of flight of the aircraft; and during a second phase of the flight of the aircraft, subsequent the first phase, switch from supplying the at least one engine with the first fuel to supplying the at least one engine with the second fuel.

According to another aspect there is provided an aircraft comprising a control unit according to the second aspect.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft. In embodiments, the at least one engine comprises at least one internal combustion engine, e.g. a jet engine.

According to another aspect there is also provided an aircraft comprising: at least one engine; a first supply apparatus comprising a first fuel tank containing a first fuel having a first composition; a second supply apparatus comprising a second fuel tank containing a second fuel having a second composition, the second composition comprising a greater proportion of sustainable aviation fuel, SAF, than the first composition; and a control unit for controlling the supply of fuels to the at least one engine, the control unit being configured to: control the first supply apparatus to supply the at least one engine with the first fuel during a first phase of flight of the aircraft; and in response to a determination that an amount of the first fuel remaining in the first fuel tank is less than a predetermined threshold, control the second supply apparatus to supply the at least one engine with the second fuel during a second phase of the flight, subsequent the first phase.

According to another aspect there is also provided an aircraft comprising: at least one engine; a fuel supply system connected to the at least one engine, the fuel supply system comprising: a first fuel container containing a first fuel having a first composition; and a second fuel container containing a second fuel having a second composition, wherein the second fuel produces fewer emissions when combusted than the first fuel, wherein the fuel supply system is switchable between a first mode, in which the at least one engine is supplied with the first fuel from the first fuel container, and a second mode, in which the at least one engine is supplied with the second fuel from the second fuel container; and a control unit configured to control the fuel supply system by: operating the fuel supply system in the first mode during a first phase of flight of the aircraft; and after the first phase of the flight, switching the fuel supply system from the first mode to the second mode. In embodiments, the second composition comprises a greater proportion of sustainable aviation fuel, SAF, than the first composition.

In embodiments, the control unit is configured to switch the fuel supply system from the first mode to the second mode in response to a determination that an amount of first fuel in the first fuel container is less than a predetermined threshold.

In embodiments, the second composition comprises at least 90% SAF, and preferably at least 95% SAF. In embodiments, the first composition comprises less than 10% SAF, and preferably less than 1% SAF.

In embodiments, the first fuel container is arranged on a wing of the aircraft, and the second fuel container is arranged on a fuselage of the aircraft. Each of the first and second fuel containers may comprise a respective fuel tank or a part of a fuel tank, e.g. a partition within a same fuel tank. In some cases, one or both of the first and second fuel containers comprises a plurality of fuel tanks.

According to another aspect there is provided an aircraft comprising: at least one engine; a first fuel having a first composition; a second fuel having a second composition, the second composition comprising a greater proportion of sustainable aviation fuel, SAF, than the first composition; and a control unit configured to, during flight of the aircraft, switch from supplying the at least one engine with the first fuel to supplying the at least one engine with the second fuel.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
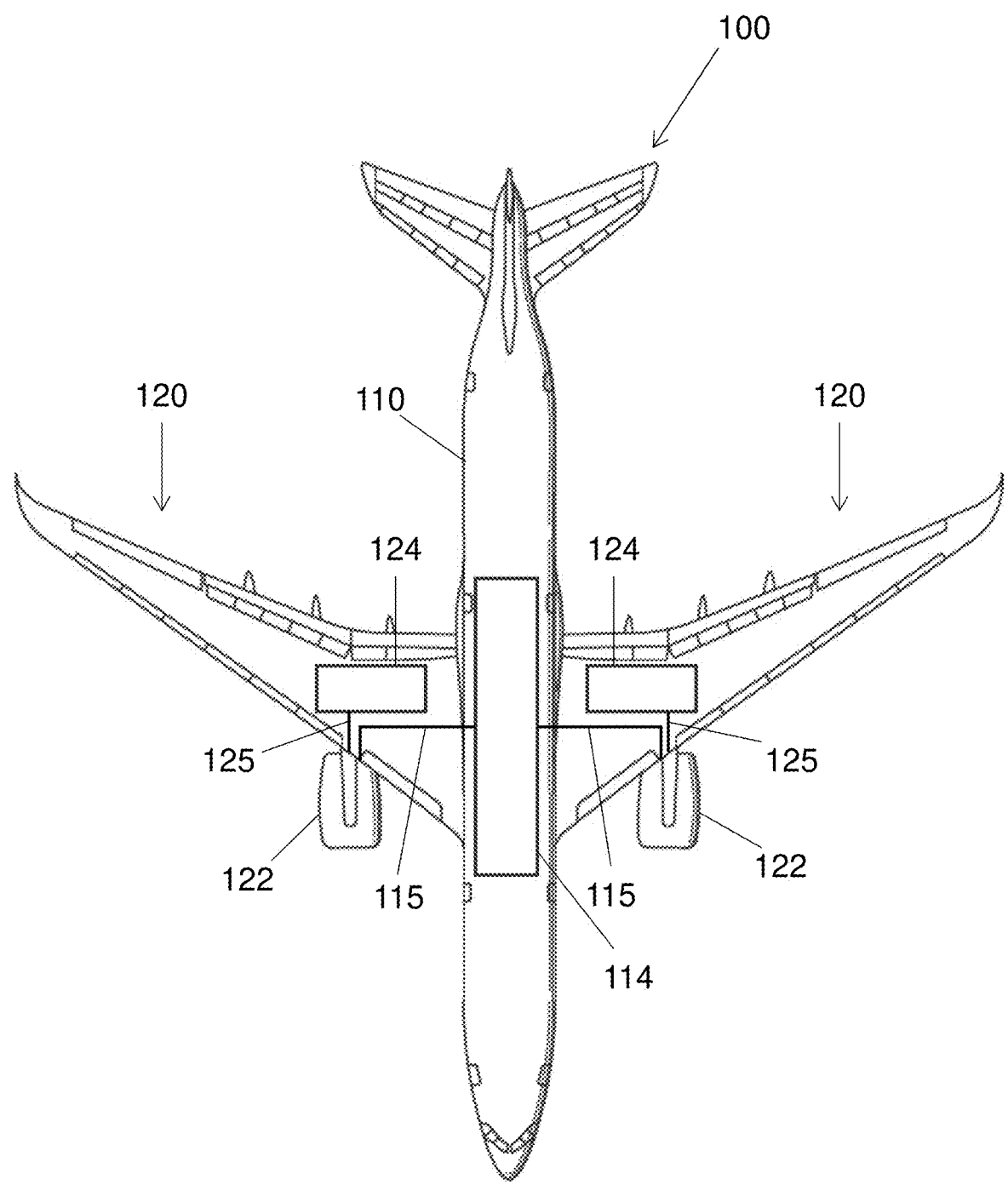
FIG. 1 shows an aircraft according to embodiments.

FIG. 1 is a plan view of an aircraft 100 according to embodiments. The aircraft 100 comprises a central fuselage 110 and two main wings 120. The central fuselage 110 comprises a central fuel tank 114. Each of the wings 120 comprises a respective internal combustion engine 122 and a respective wing fuel tank 124. Each wing fuel tank 124 is connected to its corresponding engine 122 via one or more fuel lines 125. The wing fuel tanks 124 and the corresponding fuel lines 125 may be part of a first fuel supply apparatus. The first fuel supply apparatus may also comprise one or more injection pumps for providing fuel from the wing fuel tanks 124 to the engines 122. Additionally, the central fuel tank 114 is connected to both engines 122 via one or more fuel lines 115. The central fuel tank 114 and the fuel lines 115 may be part of a second fuel supply apparatus. The second fuel supply apparatus may also comprise one or more injection pumps for providing fuel from the central fuel tank 114 to the engines 122. The first fuel supply apparatus and the second fuel supply apparatus are independent, in that each can separately and independently supply their respective fuels to the engines 122.

The central fuel tank 114 has a greater capacity than each of the wing fuel tanks 124. For example, the central fuel tank 114 may be able to carry up to 63500 kg of Jet A-1 fuel, whereas each of the two wing fuel tanks 124 may be able to carry up to 23400 kg of Jet A-1 fuel, where the density of Jet A-1 fuel is 0.801 kg/L.

The wing fuel tanks 124 contain a first fuel having a composition with a relatively low proportion of SAF (e.g. 0% SAF), whereas the central fuel tank 114 contains a second fuel having a composition with a relatively high proportion of SAF (e.g. 100% SAF). For example, the wing fuel tanks 124 may contain Jet A-1 jet fuel and the central fuel tank 114 may contain a HEFA fuel.

Figure 2:
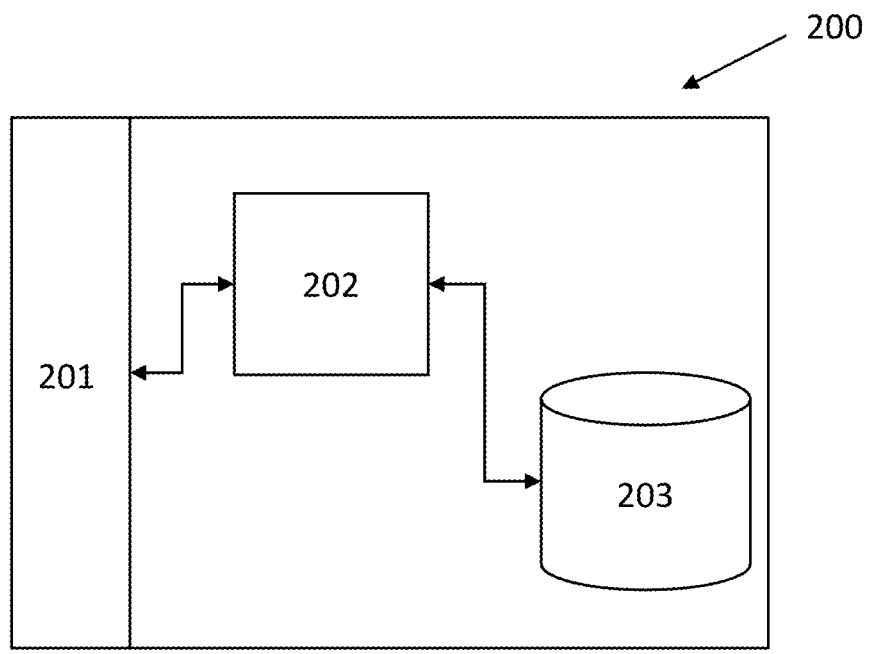
FIG. 2 shows a schematic view of a control unit according to embodiments.

FIG. 2 shows schematically a control unit 200 for the aircraft 100, according to embodiments. In the embodiments shown in FIG. 2, the control unit 200 comprises a computing device. The control unit 200 comprises a data interface 201, through which signals can be sent or received. The control unit 200 further comprises a processor 202 in communication with the data interface 201, and memory 203 in communication with the processor 202. In this way, control unit 200 can receive data, such as signal data, sensor data, etc., via the data interface 201, and the processor 202 can store the received data in the memory 203, and process it so as to perform the methods described herein, including controlling the supply of fuels to the engines of an aircraft. For example, the control unit 200 may output control signals to cause either the first fuel or the second fuel to be supplied to the engines 122 at a given time. In particular, the control unit 200 may receive a signal from a sensor indicating that an amount of the first fuel in the wing fuel tanks 124 is below a predetermined threshold, and in response to receiving such a signal, the control unit 200 may output a signal to cause the second fuel to be supplied to the engines 122 instead of the first fuel. In embodiments, the control unit 200 receives a signal from instrumentation such as an altimeter (not shown) which indicates when the aircraft 100 is at cruising altitude. In response to receiving such a signal, the switch from the first fuel to the second fuel may be performed. Alternatively, the control unit 200 may estimate how much of the first fuel shall be burnt before cruise altitude is reached, and may cause the switching from the first fuel to the second fuel in response to such an amount being reached. In alternative embodiments, the switching of fuels being fed to the engine can be performed manually by the pilot in the cockpit.

The control unit 200 may be connected to the first and second fuel supply apparatus, and configured to generate control signals to control the first and second fuel supply apparatus. In particular, the control unit 200 controls the first fuel supply apparatus to supply the engines 122 with the first fuel during a first phase of flight of the aircraft 100, and controls the second fuel supply apparatus to supply the engines 122 with the second fuel during a second, subsequent, phase of flight of the aircraft 100. For example, the control unit 200 may be configured to control the injection pumps and/or fuel lines 115, 125 of a given fuel supply apparatus, to control the supply of fuels to the engines 122.

In alternative embodiments, the control unit 200 is not computer-implemented. That is, the processor 202, memory 203 and/or data interface 201 may be omitted in some embodiments. For example, the control unit 200 may mechanically (or electro-mechanically) control the supply of fuels to the engines 220 based on input provided by a pilot of the aircraft 100 or based on received sensor data, e.g. indicating that an amount of the first fuel remaining on the aircraft is below a predetermined threshold. For example, the control unit 200 may mechanically (or electro-mechanically) control the injection pumps and/or fuel lines 115, 125 of a given fuel supply apparatus of the aircraft 100, thereby to control the supply of fuels to the engines 122.

first composition and a second fuel having a second composition, the second composition comprising a greater proportion of SAF than the first composition.

A first step 310 comprises supplying the at least one engine with the first fuel during a first phase of flight of the aircraft.

A second step 320 comprises, during a second phase of the flight of the aircraft, subsequent the first phase, switching from supplying the at least one engine with the first fuel to supplying the at least one engine with the second fuel.

As discussed above, the second fuel having a greater proportion of SAF may be less physically dense and/or more energy dense than the first fuel having a lower proportion of SAF. These properties can be exploited, e.g. in terms of reduced aircraft weight, greater flight range, reduced emissions etc., by segregating the two fuels and using them sequentially one at a time during the flight, the first fuel before the second fuel, as opposed to blending the two fuels.

As an illustrative example, Tables 1A and 1B show the weight and density properties of actual vs effective blends of SAF and non-SAF fuels in an example aircraft, where MTOW is the maximum take-off weight of the aircraft, WT is a wing tank and CT is a central tank.

TABLE 1A

|  | Tot. vol. (m^3) | WT vol. (m^3) | CT. vol. (m^3) | Total fuel weight (kg) | MTOW-SAF (kg) |
|---|---|---|---|---|---|
| A: 100% Jet A1 | 138 | — | — | 110400 | — |
| B: 5% SIP blend | 138 | — | — | 110317 | — |
| C: 50% HEFA blend | 138 | — | — | 107640 | 198740 |
| D: 100% average HEFA in WT | — | 58 | — | — | 218200 |
| E: 100% low density HEFA in WT | — | 58 | — | — | 218200 |
| F: 100% average HEFA in CT | — | — | 79 | — | 201500 |
| G: 100% low density HEFA in CT | — | — | 79 | — | 201500 |

TABLE 1B

|  | Full WT (kg) | Full CT (kg) | MTOW (kg) | CT fuel density (g/L) | WT fuel density (g/L) | Weight reduction |
|---|---|---|---|---|---|---|
| A: 100% Jet A1 | 46800 | 63500 | 265000 | 801 | 801 | 0.00% |
| B: 5% SIP blend | — | 63500 | 264917 | 799.4 | 799.4 | 0.03% |
| C: 50% HEFA blend | — | 63500 | 262240 | 780 | 780 | 1.04% |
| D: 100% average HEFA in WT | 45047 | — | 263247 | 801 | 771 | 0.66% |
| E: 100% low density HEFA in WT | 43937 | — | 262137 | 801 | 752 | 1.08% |
| F: 100% average HEFA in CT | — | 61122 | 262622 | 771 | 801 | 0.90% |
| G: 100% low density HEFA in CT | — | 59615 | 261115 | 752 | 801 | 1.47% |

Figure 3:
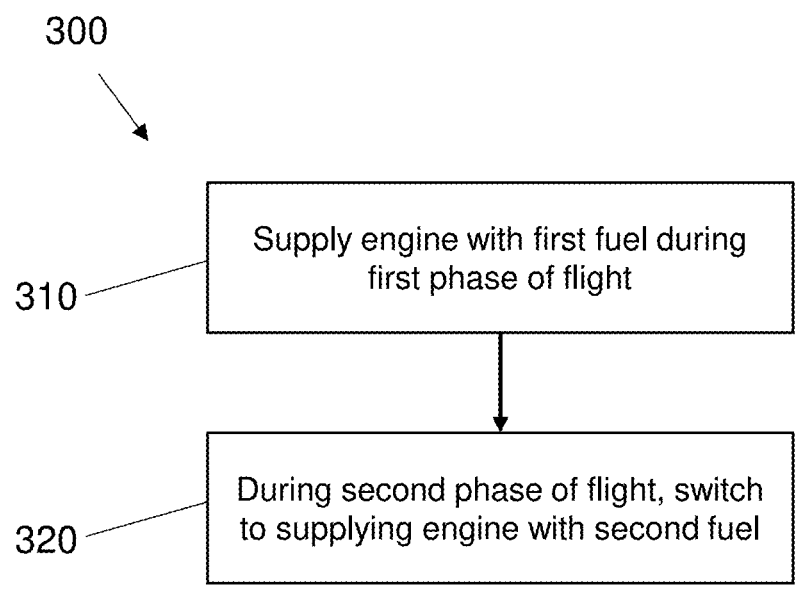
FIG. 3 is a flow diagram illustrating a method according to embodiments.

FIG. 3 shows a method 300 of controlling the supply of multiple fuels to at least one engine of an aircraft, according to embodiments. The method 300 may be performed at least in part by the control unit 200. The method 300 may be used to control the supply of multiple fuels to at least one of the engines 122 of the aircraft 100 described above with reference to FIG. 1. The aircraft comprises a first fuel having a In Tables 1A and 1B, row A shows the weight and density properties if only Jet A-1 fuel is used in both the wing tanks and the central tank, i.e. no SAF is used. Row B corresponds to an actual 5% SIP blend (i.e. 5% SAF and 95% non-SAF) in both the wing tanks and the central tank. Row C corresponds to an actual 50% HEFA blend (i.e. 50% SAF and 50% non-SAF) in both the wing tanks and the central tank.

Row D shows the weight and density properties if the wing tanks are filled with 100% SAF (in this case a typical HEFA) and the central tank is filled with Jet A-1 fuel. Row E corresponds to filling the wing tanks with 100% SAF (in this case a relatively low density HEFA) and filling the central tank with Jet A-1 fuel. Row F corresponds to filling the wing tanks with Jet A-1 fuel and filling the central tank with 100% SAF (in this case a typical HEFA). Row G corresponds to filling the wing tanks with Jet A-1 fuel and filling the central tank with 100% SAF (in this case a relatively low density HEFA). Accordingly, rows D-G correspond to 'effective', but not actual, blends of SAF and non-SAF fuels, since the SAF and non-SAF fuels are kept separately on the aircraft and are not mixed.

As shown in Tables 1A and 1B, filling the centre tank with 100% SAF and the wing tanks with 100% conventional jet fuel provides a greater overall weight reduction than filling all tanks with an actual 50-50 blend of the same SAF to conventional jet fuel. As such, segregating the two fuels on the aircraft provides a greater weight benefit than blending the fuels. Regardless of which SAF is used, segregating the SAF from the fossil-fuel-derived fuel is beneficial in terms of weight reduction (and consequently increasing the range of the aircraft) over providing a mixture of the two fuels. In particular, filling the centre tank with 100% SAF and the wing tanks with 100% Jet A-1 fuel provides an 'effective' blend (i.e. an overall ratio, rather than an actual blend) of 57.57% SAF. For an actual 57.57% blend of SAF to Jet A-1 fuel (i.e. where the two fuels are mixed in every tank), the total aircraft weight reduction would be approximately 1.197%, compared to using only Jet A-1 fuel. On the other hand, for the 'effective' blend of 57.57% of SAF to Jet A-1 fuel (where the SAF is contained in the central tank and the Jet A-1 fuel is contained in the wing tanks), the total aircraft weight reduction is approximately 1.47% compared to using only Jet A-1 fuel. As such, a greater weight reduction is obtained by segregating the fuels rather than mixing them. The SAF in this example is 6.52% less dense than Jet A-1 fuel.

Figure 4:
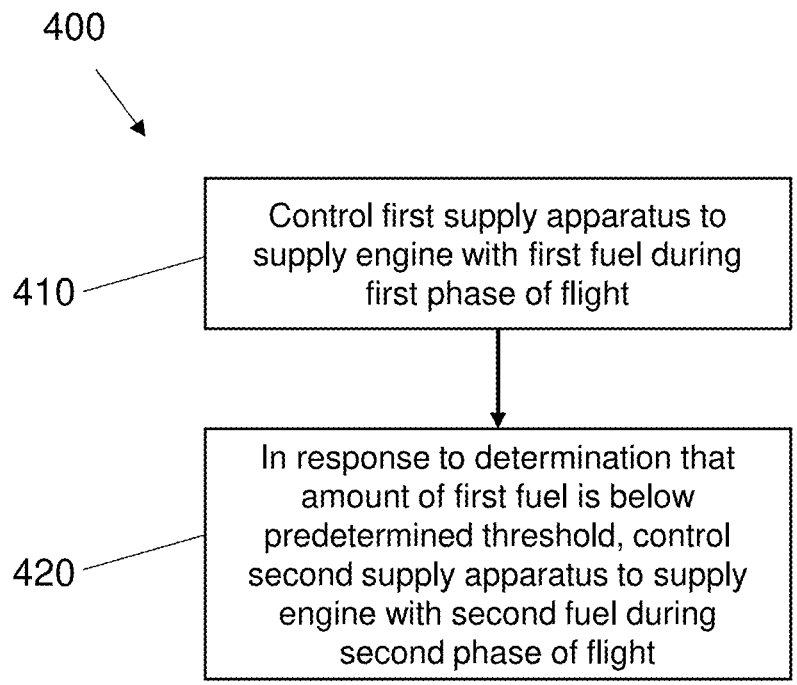
FIG. 4 is a flow diagram illustrating a method according to embodiments.

FIG. 4 shows a method 400 for controlling the supply of fuels to at least one engine of an aircraft, according to embodiments. The method 400 may be performed at least in part by the control unit 200. The method 400 may be used to control the supply of multiple fuels to at least one of the engines 122 of the aircraft 100 described above with reference to FIG. 1. The aircraft comprises a first supply apparatus comprising a first fuel tank containing a first fuel having a first composition. The aircraft also comprises a second supply apparatus comprising a second fuel tank containing a second fuel having a second composition, the second composition comprising a greater proportion of SAF than the first composition.

A first step 410 comprises controlling the first supply apparatus to supply the at least one engine with the first fuel during a first phase of flight of the aircraft.

A second step 420 comprises, in response to a determination that an amount of the first fuel remaining in the first fuel tank is less than a predetermined threshold, controlling the second supply apparatus to supply the at least one engine with the second fuel during a second phase of the flight, subsequent the first phase.

Figure 5:
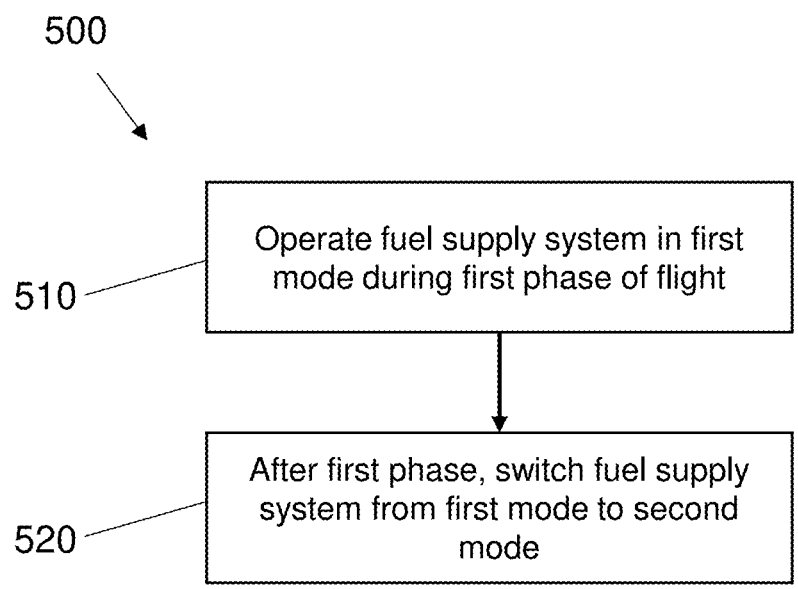
FIG. 5 is a flow diagram illustrating a method according to embodiments.

FIG. 5 shows a method 500 according to embodiments. The method 500 may be performed at least in part by the control unit 200. The method 500 may be used to control the supply of multiple fuels to at least one of the engines 122 of the aircraft described above with reference to FIG. 1. The aircraft comprises a fuel supply system connected to the at least one engine. The fuel supply system comprises a first fuel container containing a first fuel having a first composition, and a second fuel container containing a second fuel having a second composition, the second composition comprising a greater proportion of SAF than the first composition. Each of the first and second fuel containers may comprise a respective fuel tank or a respective part of a single fuel tank on the aircraft. The fuel supply system is switchable between a first mode, in which the at least one engine is supplied with the first fuel from the first fuel container, and a second mode, in which the at least one engine is supplied with the second fuel from the second fuel container.

A first step 510 comprises operating the fuel supply system in the first mode during a first phase of flight of the aircraft.

A second step 520 comprises, after the first phase of the flight, switching the fuel supply system from the first mode to the second mode.

Figure 6:
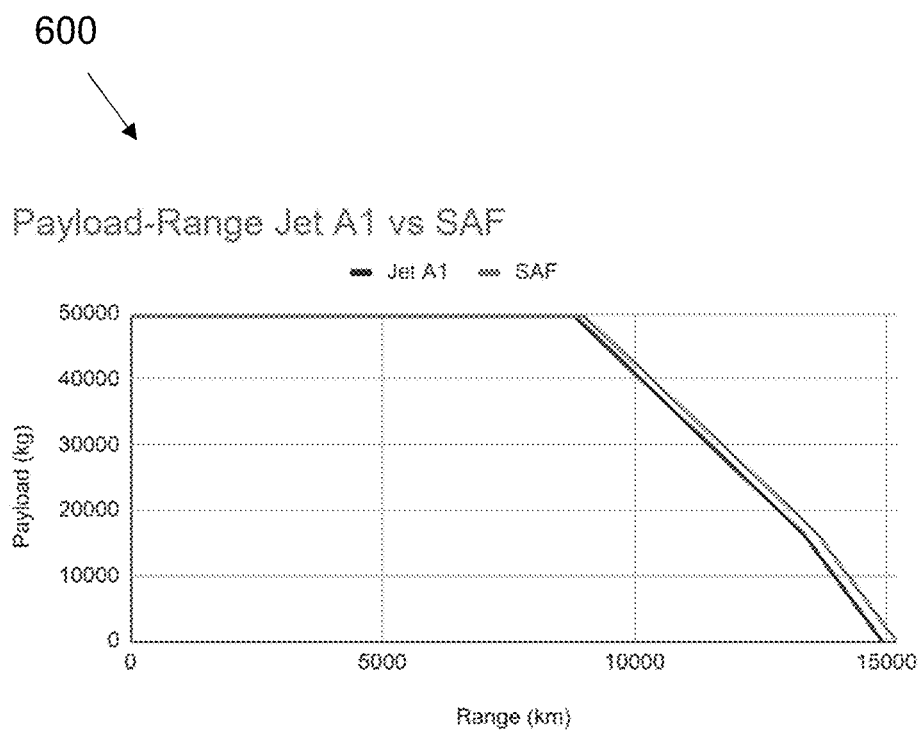
FIG. 6 is a graph showing payload vs range for Jet A-1 and SAF-based fuels, according to embodiments.

FIG. 6 shows a graph of fuel payload vs range for both Jet A-1 fuel and a SAF. A SAF with a lower heating value, LHV, variation of +1.85% over that of Jet A-1 fuel sees a range increase of approximately +1.88%. This shows that the higher energy density of SAF compared to fossil-fuel-derived jet fuels leads to an increase in aircraft range.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In embodiments described above, the first fuel (having a relatively low proportion of SAF, e.g. 0% SAF) is stored in the wing fuel tanks of the aircraft, and the second fuel (having a relatively high proportion of SAF, e.g. 100% SAF) is stored in the central fuel tank of the aircraft. In alternative embodiments, the first fuel is stored in the central fuel tank and the second fuel is stored in the wing fuel tanks.

In embodiments described above, the switching from the first fuel to the second fuel is performed in response to a determination that an amount of the first fuel remaining in the aircraft is less than a predetermined threshold. In alternative embodiments, the switching from the first fuel to the second fuel is performed in response to a different trigger event, e.g. the expiry of a predetermined time period from take-off or the aircraft exceeding a predetermined flight distance from take-off.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. A method of controlling the supply of multiple fuels to at least one engine of an aircraft, the aircraft comprising a first fuel having a first composition and a second fuel having a second composition,
the method comprising:
supplying the at least one engine with the first fuel during a first phase of flight of the aircraft; and
during a second phase of the flight of the aircraft, subsequent the first phase, switching from supplying the at least one engine with the first fuel to supplying the at least one engine with the second fuel,
wherein:
the second composition comprises a greater proportion of sustainable aviation fuel, SAF, than the first composition,
the second fuel is less physically dense and/or more energy dense than the first fuel, such that supplying the at least one engine with the first fuel prior to supplying the at least one engine with the second fuel extends a range of the flight of the aircraft, and
wherein the switching is performed in response to a determination that an amount of the first fuel remaining in the aircraft is less than a predetermined threshold.

2. The method according to claim 1, wherein the first fuel and the second fuel are stored separately, in a segregated manner, on the aircraft.

3. The method according to claim 1, wherein the second fuel is both less physically dense and more energy dense than the first fuel.

4. The method according to claim 1, wherein the second composition comprises at least 90% SAF.

5. The method according to claim 1, wherein the second composition comprises 100% SAF.

6. The method according to claim 1, wherein the second fuel is a fuel derived from a Fischer-Tropsch process.

7. The method according to claim 1, wherein the second fuel is a Hydroprocessed Esters and Fatty Acids, HEFA, fuel.

8. The method according to claim 1, wherein the first composition comprises less than 10% SAF.

9. The method according to claim 1, wherein the first fuel is Jet A-1 fuel.

10. The method according to claim 1, wherein the first fuel is contained in a first fuel tank of the aircraft and the second fuel is contained in a second fuel tank of the aircraft.

11. The method according to claim 10, wherein the first fuel tank is arranged on a wing of the aircraft, and the second fuel tank is arranged on a fuselage of the aircraft.

12. The method according to claim 11,
wherein the aircraft comprises a further fuel tank containing the first fuel, the further fuel tank being arranged on a wing of the aircraft, and
wherein the method comprises supplying the at least one engine with the first fuel from the further fuel tank prior to the second phase of the flight.

13. A method of controlling the supply of multiple fuels to at least one engine of an aircraft, the aircraft comprising a first fuel having a first composition and a second fuel having a second composition,
the method comprising:
supplying the at least one engine with the first fuel during a first phase of flight of the aircraft; and
during a second phase of the flight of the aircraft, subsequent the first phase, switching from supplying the at least one engine with the first fuel to supplying the at least one engine with the second fuel,
wherein:
the second composition comprises a greater proportion of sustainable aviation fuel, SAF, than the first composition,
the second fuel is less physically dense and/or more energy dense than the first fuel, such that supplying the at least one engine with the first fuel prior to supplying the at least one engine with the second fuel extends a range of the flight of the aircraft, wherein the second phase is part of a cruise stage of the flight.

14. A control unit for controlling the supply of multiple fuels to at least one engine of an aircraft, the aircraft comprising a first fuel having a first composition and a second fuel having a second composition,
wherein the control unit is configured to:
supply the at least one engine with the first fuel during a first phase of flight of the aircraft; and
during a second phase of the flight of the aircraft, subsequent the first phase, switch from supplying the at least one engine with the first fuel to supplying the at least one engine with the second fuel,
wherein:
the second composition comprises a greater proportion of sustainable aviation fuel, SAF, than the first composition,
the second fuel is less physically dense and/or more energy dense than the first fuel, such that supplying the at least one engine with the first fuel prior to supplying the at least one engine with the second fuel extends a range of the flight of the aircraft, and
wherein the switching is performed in response to a determination that an amount of the first fuel remaining in the aircraft is less than a predetermined threshold.

15. The control unit according to claim 14, wherein the first fuel and the second fuel are stored separately, in a segregated manner, on the aircraft.

16. The control unit according to claim 14, wherein the second fuel is both less physically dense and more energy dense than the first fuel.

17. The control unit according to claim 14, wherein the second composition comprises at least 90% SAF.

18. An aircraft comprising:
at least one engine;
a first supply apparatus comprising a first fuel tank containing a first fuel having a first composition; a
a second supply apparatus comprising a second fuel tank containing a second fuel having a second composition, the second composition comprising a greater proportion of sustainable aviation fuel, SAF, than the first composition, wherein the second fuel is less physically dense and/or more energy dense than the first fuel; and
a control unit for controlling the supply of fuels to the at least one engine to extend a range of flight of the aircraft, the control unit being configured to:
control the first supply apparatus to supply the at least one engine with the first fuel during a first phase of flight of the aircraft; and in response to a determination that an amount of the first fuel remaining in the first fuel tank is less than a predetermined threshold, control the second supply apparatus to supply the at least one engine with the second fuel during a second phase of the flight, subsequent the first phase.

* * * * *